Aug. 9, 1960 R. M. SCHULTZ 2,948,441
COLLAR MOLDING MEANS
Filed Oct. 2, 1956 2 Sheets-Sheet 1
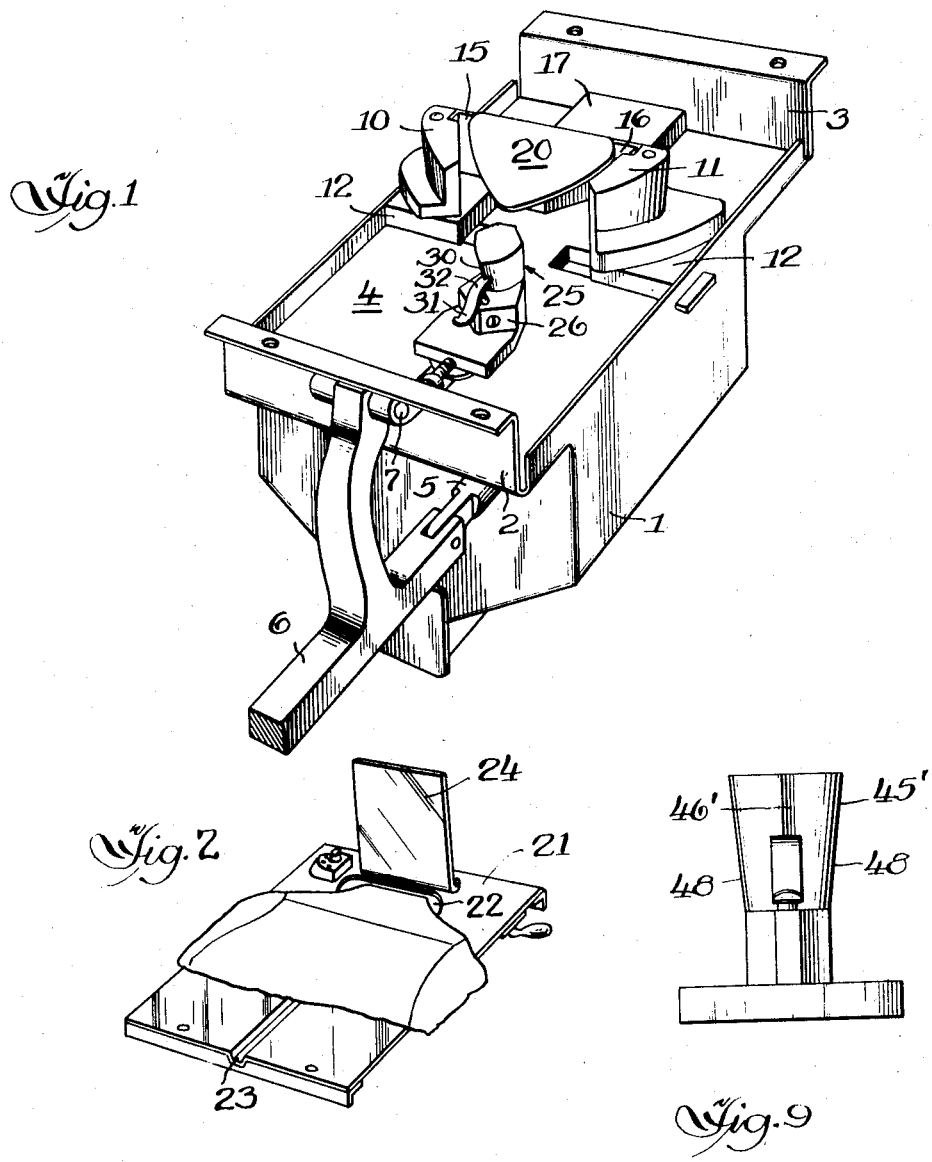
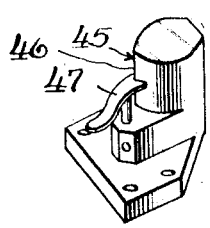
Inventor,
Roy M. Schultz
By: Schneider & Dressler
Attys.

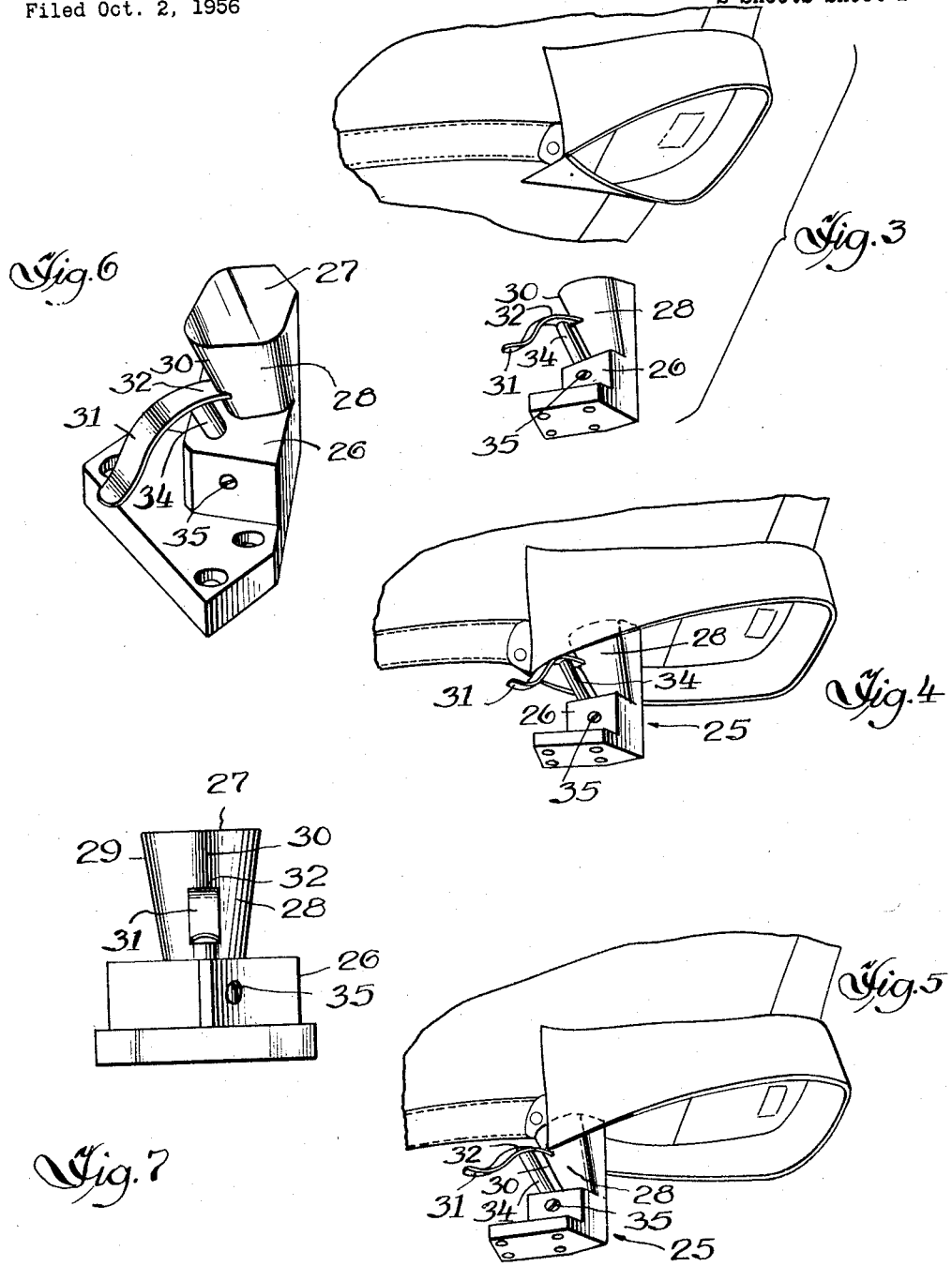

2,948,441

United States Patent Office

Patented Aug. 9, 1960

2,948,441

COLLAR MOLDING MEANS

Roy M. Schultz, Chicago, Ill., assignor to David A. Freeman

Filed Oct. 2, 1956, Ser. No. 613,552

11 Claims. (Cl. 223—52.1)

This invention relates to a collar molding means and more particularly to a means for molding or shaping and pressing the collar of garments. While the invention may be used with collars for various garments, it is particularly useful in connection with shirts, pajamas and similar garments.

The present invention is particularly concerned with the molding blocks which perform the actual function of pressing and shaping a collar. Such blocks are used on various types of collar molding machines. In such machines, the collar of a garment, such as a shirt, for example, is operated upon by a combination of front and lateral blocks and usually a rear block or has means for providing a pressing surface for the rear portion of a collar. The various blocks and pressing surfaces operate on the inside of the collar, such as, for example, the part that would correspond to a neckband in a conventional dress shirt.

As is well known, a collar molding machine may provide two side blocks which are movable to and from each other. A front block which may be stationary or movable along a line generally perpendicular to the line of motion of the said side blocks cooperates with the inside of the collar front where the ends of the collar are buttoned.

A collar molding machine has suitable means for operating the blocks, the blocks usually being heated to a sufficient temperature for effecting pressing while stretching the collar. The collar molding blocks are usually retracted first to permit positioning the shirt collar over the same. The ends of the collar are buttoned and the shirt is disposed so that the collar opening faces downwardly over the retracted blocks. The yoke of the shirt, this portion being just below the rear of the collar, may usually be disposed upon a canopy plate or other rest.

In molding the collar for a garment, it is important to provide substantial tension on the collar or collar band, as well as heat and pressure for pressing the same. This molding action is properly effective on a collar only when the collar is properly positioned on the molding blocks. This is particularly true because of the various shapes, sizes and molding requirements. It is impractical to expect an operator to use care in determining the proper position of a shirt collar, for example, on the molding blocks in connection with molding the collar. As a rule, the shirt or other garment is quickly positioned with the collar disposed over the retracted molding blocks. Thereafter power is supplied to return the molding blocks to a position where they tend to move away from each other and thus impart tension to the collar.

This invention provides a molding block and particularly a front molding block having a construction such that a garment collar tends to automatically position itself correctly when the blocks tension the collar material in preparation for the molding operation. A collar molding machine embodying the present invention, therefore, has the highly desirable characteristic of properly molding a garment collar irrespective of the manner of initially positioning the garment on the block.

For an understanding of the invention, reference will now be made to the drawings wherein embodiments illustrative of the invention are shown, it being understood that variations from such embodiments may be made without departing from the scope of the invention except as defined by the appended claims.

Figure 1 is a perspective detail of the operating head of a collar mold machine provided with the new molding block;

Fig. 2 is a perspective view of the top of collar molding machine with a shirt positioned for operating thereon;

Fig. 3 is a perspective view illustrating the position of a shirt and collar with respect to the new block prior to the positioning of the collar on the block;

Fig. 4 is a perspective view similar to Fig. 3 but showing the collar in its initial position on the new block;

Fig. 5 is a perspective view similar to Fig. 4 but showing the collar in its final position on the new block;

Fig. 6 is a perspective view of the block embodying the present invention;

Fig. 7 is a front elevation of the block of Fig. 6;

Fig. 8 is a perspective view of a modified block embodying the present invention; and Fig. 9 is a front elevation of the block illustrated in Fig. 6.

A collar molding machine has a base generally indicated by 1 with front flange 2 and rear flange 3. Base 1 has panel 4 below which the operating mechanism is disposed. Supported in base 1 for longitudinal movement is rod 5 pivotally joined to operating handle 6 hingedly secured by pin 7 to front flange 2. The collar molding machine has side blocks 10 and 11 movable toward and away from each other above panel 4 generally along a straight line. Blocks 10 and 11 are disposed on suitable base blocks 12. The base blocks 12 or molding blocks 10 and 11 are heated by suitable means such as electric heating elements or gas. It is understood that the blocks are heated to a temperature satisfactory for ironing the collar fabric. As shown in Figure 1, blocks 10 and 11 have their sides shaped so that the blocks extend inwardly toward the base so that the block sides overhang. Blocks 10 and 11 may have straight sides if desired.

Blocks 10 and 11 may carry overlapping blades 15 and 16 extending toward each other and adapted to press the inside rear surface of the collar. Blades 15 and 16 are usually heated by conduction from molding blocks 10 and 11. Rear block 17 having a suitable heater may also be provided, this rear block having a stationary blade (not shown) disposed between two blades 15 and 16.

Supported in suitable fashion, as by the rear block or by a separate post, there may be provided canopy 20 generally consisting of a flat metal plate having a generally triangular outline. Canopy plate 20 is adapted to support the yoke of a shirt and is high enough for blocks 10 and 11 to be movable underneath the canopy.

Cooperating with the molding blocks so far described is front molding block 25. Front molding block 25 is disposed generally symmetrical with respect to side blocks 10 and 11. Front block 25 may either be stationary or may be movable to and from the line of travel of the side blocks. As is well known in collar molding machines, if the front block is movable, the entire complement of molding blocks move simultaneously inwardly toward each other and outwardly away from each other respectively for positioning the work and for molding the collar. Cover plate 21 is above flanges 2 and 3. The cover plate may be supported on flanges 2 and 3 or may support these flanges and have other means for supporting the cover plate. The cover plate has opening 22 somewhat larger than the canopy plate and permitting a shirt collar to be disposed over the molding blocks. Cover plate 21 has shallow channel 23 for accommodating the buttons of a shirt. Hinged form plate 24 is provided for aiding in folding the shirt. Cover plate 21 may have switches and control handle for controlling the operation of the machine.

Front molding block 25 as shown rests on pedestal 26 but may be integral therewith and during use may be heated or not, depending upon whether the front molding block is to operate hot or cold. Front molding block 25 has top face 27 generally flat. The block is dimensioned to be movable under the canopy plate when so provided. Front molding block 25 is so shaped as to provide curving sides 28 and 29 meeting at front 30. Front 30 of the molding block is usually rounded, the curvature varying as desired.

In accordance with the present invention, front molding block 25 is shaped so that front 30 of the molding block extends downwardly and rearwardly from top face 27 to pedestal 26. The inclination of front 30 may vary within wide limits but will usually range from an extreme of zero angle where front 30 extends straight up and down, as illustrated in the modification of Figure 8, to as much as an inclination of 30 or 45 degrees.

If a buttoned or pinned shirt collar, as illustrated in Figure 3, is positioned over the molding blocks, the tension on the collar due to the expanding blocks will create a component on the rearward slope of front 30 of the front molding block causing the inside portion of the front of the collar to slide down to the lowest position available on the front molding block. In order to aid in the proper positioning of the shirt collar with reference to front block 25 and also to provide a bottom limit for the positioning of the front portion of the collar, strip support 31 is provided.

Support 31 consists of a strip of suitable material such as metal, for example stainless steel, or plastic or ceramic, the strip being arched as illustrated in Figures 3, 4 and 5. End portion 32 of strip 31 is disposed against front 30 at a desired distance along the height of the collar block.

Strip support 31 is carried by post 34 which may be adjustably secured in pedestal 26 by suitable means as bolt 35. Strip 31 may have any desired width.

The length of strip 31 is sufficient so that in the contracted position of the molding blocks, the front portion of a garment collar may be disposed upon the free end portion of support 31. The remainder of the garment collar will be disposed around the outside of side blocks 10 and 11 and outside blades 15 and 16. When the various molding blocks are moved to their expanded position, the buttoned garment collar will be tensioned and the front of the collar will slide along the top surface of support 31 as in Figure 4 and then into position as illustrated in Figure 5, where the front of the collar is disposed immediately against front 30 of molding block 25.

All the molding blocks are preferably of polished metal so that the garment collar may slip into position properly when the various molding blocks assume their expanded position. Thus irrespective of the initial positioning of the garment collar with respect to the molding blocks, the expansion of the molding blocks will result in the proper positioning of the garment collar for molding and pressing.

In Figure 8, a modified front block 45 has a straight front 46. Support strip 47 limits the downward travel of the front of the collar. This form of front block may be used with overhanging side blocks as illustrated in Figure 1 to insure proper positioning of the shirt collar and maintenance of proper position during stretching of the collar.

It is clear that the front block may have straight sides or sides which extend inwardly toward the base block as illustrated in Figure 9. Thus in Figure 8, the front block has straight sides. In Figure 9, front block 45' has sides 48 which slant inwardly from the top and approach each other at the base.

I claim:

1. In a collar molding machine, a pair of side blocks and a front block relatively movable toward and away from each other for engaging the inside of a garment collar to tension the same, said front block being disposed in a position to engage the front of the inside of the garment collar, and guide means cooperatively disposed at the front of the front block to engage the front of the garment collar and guide the same to the front block and to a correct position against the front of the front block when the garment collar is tensioned by movement of the blocks away from each other.

2. In a collar molding machine, side molding blocks and a front molding block relatively movable toward and away from each other for engaging the inside of a garment collar to tension the same, said front block being disposed in a position to engage the front of the inside of the garment collar, and a guide strip upon which the front of the collar is adapted to rest, said guide strip being cooperatively disposed at the front of the front block to guide the front of the garment collar to a correct position against the front of the front block when the garment collar is tensioned.

3. A front molding block for a garment collar molding machine, said block comprising a base portion and a mass of metal extending upwardly from the base portion and having a front and sides, said mass of metal being shaped to provide a block front which is a substantially straight line in a vertical plane extending longitudinally of the block and as viewed laterally of the block, said straight front forming an angle with the horizontal ranging up to 90°, any angle less than 90° being created by the upward and forward inclination of the block front, and stop means are provided at the front of the block and at a region intermediate the top and bottom portions of the block, said stop means being disposed to cooperate with the front portion of the block to limit the downward travel of a garment collar during tensioning and molding.

4. A front molding block for a garment collar molding machine, said block comprising a base portion and a mass of metal extending upwardly from the base portion and having a front and sides, said mass of metal being shaped to provide a block front which is a substantially straight line in a vertical plane extending longitudinally of the block and as viewed laterally of the block, said straight front forming an angle with the horizontal ranging up to 90°, any angle less than 90° being created by the upward and forward inclination of the block front, and guide means are provided for the front, said guide means comprising an arched strip upon which the button strip of a garment is adapted to rest, said strip arching upwardly so that a shirt collar is guided by said strip to the correct position against the front of said block when the shirt collar is tensioned.

5. A front molding block for a garment collar molding machine, said block comprising a base portion and a mass of metal extending upwardly from the base portion and having a front and sides, said mass of metal being shaped to provide a block front which is a substantially straight line in a vertical plane extending longitudinally of the block and as viewed laterally of the block, said straight front forming an angle with the horizontal ranging up to 90°, any angle less than 90° being created by the upward and forward inclination of the block front, and guide means are provided for the front, said guide means comprising an arched strip upon which the button strip of a garment is adapted to rest, said strip arching upwardly so that a shirt collar is guided by said strip to the correct position against the front of said block when the shirt collar is tensioned, and a post extending into the base of said block, said arched strip being secured to the top of said post, and said post being adjustable to adjustably position said arched strip at a desired height.

6. In a collar molding machine of the type having a pair of side blocks movable to and from each other for engaging a garment collar, a front molding block for engaging the inside of the front of a collar, said front molding block having a front remote from the side blocks, said front extending downwardly and inwardly of the block as measured from the top of the molding block whereby a garment collar tensioned by said molding blocks will tend to slide down along the front molding block, and stop means at the front of said front molding block and at a region intermediate the top and bottom portions of the molding block, said stop means being disposed to cooperate with the front portion of the block to limit the downward travel of a garment collar during tensioning.

7. In a collar molding machine of the type having a pair of side blocks movable to and from each other for engaging a garment collar, a front molding block for engaging the inside of the front of a collar, said front molding block having a front remote from the side blocks, said front extending downwardly and inwardly of the block as measured from the top of the molding block whereby a garment collar tensioned by said molding blocks will tend to slide down along the front molding block, and stop means at the front of said front molding block and at a region intermediate the top and bottom portions of the molding block, said stop means being disposed to cooperate with the front portion of the block to limit the downward travel of a garment collar during tensioning, and means for adjusting the position of said stop means.

8. A front molding block for a garment collar molding machine, said block comprising a base portion and a mass of metal extending upwardly from the base portion, said mass of metal being shaped to provide a block front which is a substantially straight line in a vertical plane extending longitudinally of the block and which is perpendicular to the base as viewed laterally of the block, said block front being adapted to cooperate with and mold the inside of the front portion of a garment collar, and stop means at the front of the block and disposed at a region intermediate the top and bottom portions of the mass of metal extending upwardly from the base, said stop means being disposed to limit the downward travel of the collar when the collar is in a collar molding machine and is being tensioned against said block.

9. A front molding block for a garment collar molding machine, said block comprising a base portion and a mass of metal extending upwardly from the base portion, said mass of metal being shaped to provide a block front which is a substantially straight line in a vertical plane extending longitudinally of the block and which block front is perpendicular to the base as viewed laterally of the block, said mass being shaped to provide overhanging sides as viewed from the front of the block, said overhanging sides extending substantially straight upwardly and outwardly from the base, and stop means at the front of the block and disposed at a region intermediate the top and bottom portions of the mass of metal, said stop means being disposed to cooperate with the front portion of the block to limit downward travel of a garment collar during tensioning thereof against the block.

10. The construction according to claim 9 wherein stop means are provided at the front of the block and disposed at a region intermediate the top and bottom portions of the mass of metal, said stop means being disposed to cooperate with the front portion of the block to limit downward travel of a garment collar during tensioning thereof against the block, said stop means comprising an arched strip upon which the button strip of a garment is adapted to rest, said strip arching upwardly so that a shirt collar is guided by said strip to the correct position against the front of said block when the shirt collar is tensioned.

11. A front molding block for a garment collar moldign machine, said block comprising a base portion and a mass of metal extending upwardly from the base portion and having a front and sides, said mass of metal being shaped to provide a block front which is a substantially straight line in a vertical plane extending longitudinally of the block and as viewed laterally of the block, said straight front forming an angle with the horizontal ranging up to 90°, any angle less than 90° being created by the upward and forward inclination of the block front, and stop means at the front of the block and disposed at a region intermediate the top and bottom portions of the block, said stop means being disposed to cooperate with the front portion of the block to limit the downward travel of a garment collar during tensioning, said stop means comprising an arched strip upon which the button strip of a garment is adapted to rest, said strip arching upwardly so that a shirt collar is guided by said strip to the correct position against the front of said block when the shirt collar is tensioned, a post carrying said arched strip and means for adjusting said post in said base to determine the height of said strip.

References Cited in the file of this patent

UNITED STATES PATENTS

| | | |
|---|---|---|
| 2,172,857 | Steele | Sept. 12, 1939 |
| 2,504,934 | Luke | Apr. 18, 1950 |
| 2,768,774 | Rieck | Oct. 30, 1956 |
| 2,829,809 | Freeman | Apr. 8, 1958 |
| 2,847,150 | Neckel | Aug. 12, 1958 |